United States Patent [19]

Aonuma et al.

[11] 4,007,072
[45] Feb. 8, 1977

[54] FERROMAGNETIC METAL POWDER COMPRISING LEAD AND METHOD FOR MAKING THE SAME

[75] Inventors: Masashi Aonuma; Yasuo Tamai, both of Odawara, Japan

[73] Assignee: Fuji Photo Film Co., Ltd., Minami-ashigara, Japan

[22] Filed: Nov. 18, 1974

[21] Appl. No.: 524,858

[30] Foreign Application Priority Data

Nov. 16, 1973 Japan .................... 48-128988

[52] U.S. Cl. .................... 148/105; 75/.5 A; 252/62.55
[51] Int. Cl.² .................... H01F 1/02
[58] Field of Search ......... 148/105; 75/.5 AA, 122; 427/127, 129, 132; 252/62.55, 62.58, 62.62; 204/192; 333/30 R

[56] References Cited

UNITED STATES PATENTS

| 3,206,338 | 9/1965 | Miller et al. .................... 148/105 |
| 3,282,723 | 11/1966 | Melillo .................... 427/129 |
| 3,337,327 | 8/1967 | Jordan et al. .................... 75/.5 AA |
| 3,661,556 | 5/1972 | Jolley et al. .................... 75/.5 AA |
| 3,669,643 | 6/1972 | Bagley et al. .................... 75/.5 AA |
| 3,681,226 | 8/1972 | Vogel .................... 204/192 |
| 3,748,119 | 7/1973 | Hwang et al. .................... 75/.5 AA |
| 3,838,365 | 9/1974 | Dutoit .................... 333/30 R |
| 3,856,513 | 12/1974 | Chen et al. .................... 75/122 |
| 3,859,130 | 1/1975 | Parker et al. .................... 117/240 |
| 3,880,743 | 4/1975 | Lang .................... 204/165 |
| 3,902,888 | 9/1975 | Aonuma et al. .................... 75/.5 AA |

*Primary Examiner*—Walter R. Satterfield
*Attorney, Agent, or Firm*—Sughrue, Rothwell, Mion, Zinn & Macpeak

[57] ABSTRACT

A powdery ferromagnetic metal material for a magnetic recording medium containing at least Fe, B and Pb as the main component and a process for producing a powdery ferromagnetic metal material comprising reducing a metal salt capable of forming a ferromagnetic substance and containing at least Fe in an aqueous solution thereof using a borohydride compound and/or derivative thereof in the presence of a Pb compound.

25 Claims, 1 Drawing Figure

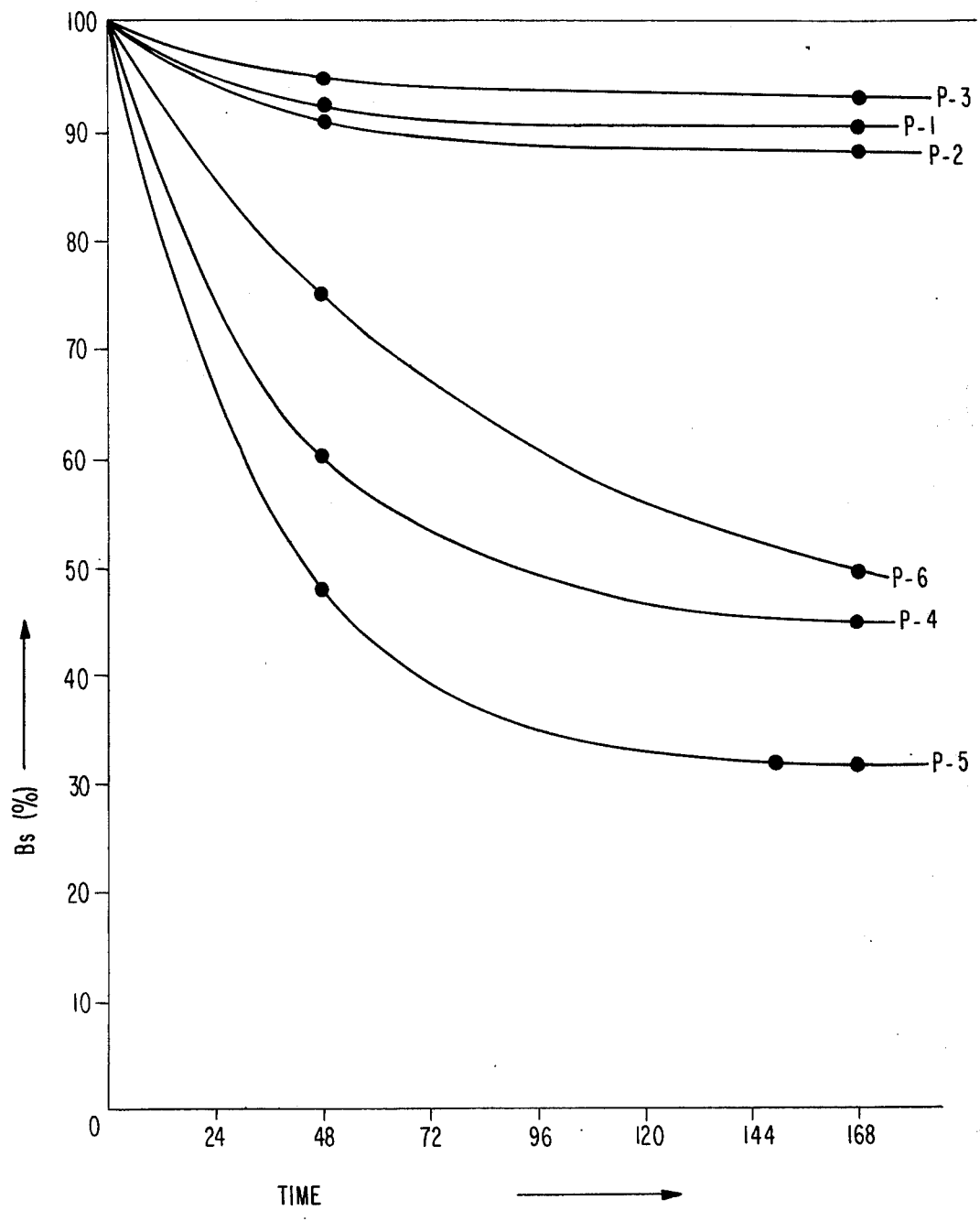

4,007,072

FERROMAGNETIC METAL POWDER COMPRISING LEAD AND METHOD FOR MAKING THE SAME

BACKGROUND OF THE INVENTION

1. Field of the Invention

The present invention relates to a powdery magnetic material for a magnetic recording medium and a process for the production of the same. More particularly, the present invention relates to a powdery metal magnetic material and a process for the production of the same.

2. Description of the Prior Art

Hitherto, $\gamma$-$Fe_2O_3$, Co containing $\gamma$-$Fe_2O_3$, $Fe_3O_4$, Co containing $Fe_3O_4$, $CrO_2$ and the like have been used as a ferromagnetic powder for use in a magnetic recording medium. These ferromagnetic powders, however, have not been suitable for the magnetic recording of a signal of a short recording wave length, e.g., 10 microns or less. That is, the magnetic properties such as coercive force (Hc), maximum residual magnetic flux density (Br), and the like are insufficient for use in the so-called high density recording. Recently, ferromagnetic powders having properties suitable for high density recording have been extensively investigated. One of these ferromagnetic powders is a ferromagnetic metal powder. The powder is made of a metal or a metal alloy. Metals such as iron, cobalt and nickel are mainly used, and, if desired, chromium, manganese, rare earth elements, zinc, and the like are added.

The following methods are known for producing a ferromagnetic substance.

1. A method comprising decomposing an organic salt of a ferromagnetic metal by heating followed by a reduction thereof in a reducing atmosphere, as described in, for example, Japanese Patent Publication Nos. 11412/1961, 22230/1961, 8027/1965, 14818/1966, 22394/1968, 38417/1972, etc., and *The Record of Electrical and Communication Engineering Conversazione Tohoku University*, Vol. 33, No. 2, page 57 (1964).

2. A method comprising reducing a needle-like oxyhydroxide compound or those compounds containing other metals in addition to the oxyhydroxide compound, or needle-like iron oxide produced from these needle-like oxyhydroxide compound, as described in, for example, Japanese Patent Publication Nos. 3862/1960, 20939/1964, 39477/1972, etc., German Patent Laid Open No. 2,130,921, British Patent No. 1,192,167, U.S. Pat. No. 3,681,018, etc.

3. A method comprising evaporating a ferromagnetic metal in an inert gas, as described in, for example, Japanese Patent Publication No. 27718/1972, and *Ohyo Butsuri* (*Applied Physics*), Vol. 40, No. 1, page 110 (1971).

4. A method comprising decomposing a metal carbonyl compound, as described in, for example, U.S. Pat. Nos. 2,983,997, 3,172,776, 3,200,007, 3,228,882, etc.

5. A method comprising electro-depositing a ferromagnetic metal using a mercury cathode followed by the separation of the metal from the mercury, as described in, for example, Japanese Patent Publication No. 15525/1964, 8123/1965, etc., and U.S. Pat. No. 3,156,650.

6. A method comprising reducing a salt of a ferromagnetic metal in a solution thereof, as described in, for example, Japanese Patent Publication Nos. 20520/1963, 26555/1963, 20116/1968, 41718/1972, etc., U.S. Pat. Nos. 3,206,338, 3,494,760, 3,567,525, 3,535,104, 3,607,218, 3,661,556, 3,663,318, 3,669,643, 3,672,867, 3,756,866, German Patent Laid Open No. 2,132,430, 2,326,258, 2,326,261, etc.

The present invention is concerned with Method (6) above wherein a ferromagnetic metal salt is reduced in a solution thereof, and particularly, a borohydride compound or a derivative thereof is used as a reducing agent.

Method (6) of reducing a ferromagnetic metal salt in a solution thereof using a borohydride compound or a derivative thereof, has the following defects. That is, in general, in order to provide magnetic anisotropy, the reaction is effected in a magnetic field to thereby cause particles to form a chain, and thus shape anisotropy is obtained. However, when the particle chains are mixed with and dispersed in a binder, they are broken, resulting in a reduction in the shape anisotropy. Thus, a tape produced using particle chains has tended to be inferior in the orientation in magnetic field, and poor in squareness ratio Br/Bs (where Br is the residual magnetic flux density and Bs is the saturated magnetic flux density).

Furthermore, a powder produced by the above described method is not humidity-resistant, particularly in the case where Fe is present, and thus the powder is gradually oxidized even though the powder is stored in an aqueous reaction solution or in air at an ordinary temperature, and, in the extreme cases, the magnetic properties are lost.

Moreover, the surface activity of the particles produced by the above described method is high, i.e., the particles are highly reactive, and thus they are industrially disadvantageous from the standpoint of process control.

Hitherto, various methods have been proposed in order to remove the above described drawbacks. For instance, Japanese Patent Publication No. 20520/1963 describes Fe-B based magnetic recording materials containing Co, Ni, Mn, and Cr, prepared by a process which comprises applying either of the solutions of a hydrophilic high molecular weight material containing a salt of a ferromagnetic metal or a hydrophilic high molecular weight material containing a borohydride to a support to form a layer of the hydrophilic high molecular weight material on the support, applying the other solution onto the layer to precipitate the ferromagnetic metal particles in a dispersed state in the hydrophilic high molecular weight material. Japanese Patent Publication No. 7820/1972 describes Fe-B based materials containing Co, Ni, Mn, Cu, and Ag, prepared by a process which comprises reducing a solution of at least one ferromagnetic metal salt with a borohydride with the improvement conprising adding a surface active agent to the solution. Further Japanese Patent Publication No. 20116/1968 describes a process for preparing an oxidation-resistant wet-process magnetic metal powder which comprises adding sodium or potassium borohydride to a mixture of (A) an aqueous solution of a salt of iron, cobalt, nickel, etc.) and (B) a dispersion of a higher aliphatic acid which is liquid at ambient temperature in the presence or absence of an additive which is capable of liberating a higher aliphatic acid upon hydrolysis of the additive thereby reducing the magnetic metal salt to precipitate the metal particles and at the same time saponify the surface of the metal particles with the higher aliphatic acid. However, it has been difficult to remove the above described drawbacks using these methods.

SUMMARY OF THE INVENTION

An object of the present invention is to remove the drawbacks using a material having a novel composition.

An object of the present invention is to provide a powdery magnetic material, whose magnetic properties are improved.

Another object of the present invention is to provide a powdery magnetic material which is humidity-resistant and is difficult to be oxidized.

An even further object of the present invention is to provide a powdery magnetic material which is relatively stable in production and thus which can be easily produced.

The present invention provides a powdery ferromagnetic metal material for a magnetic recording medium containing at least Fe, B, and Pb as the main components. The powdery ferromagnetic metal material is produced by reducing in the presence of a lead compound a metal salt capable of forming a ferromagnetic substance and containing at least Fe in an aqueous solution thereof using a borohydride compound and/or a derivative thereof. The present invention will be fully understood from the following detailed description.

BRIEF DESCRIPTION OF THE DRAWINGS

The FIGURE shows the relation between the processing time and the decrease in the $Bs$ value where the powdery magnetic material produced in the Examples and the Comparison Examples are processed in an atmosphere of 60° C and 90% RH, in which the $Bs$ value prior to the processing is set at 100%.

DETAILED DESCRIPTION OF THE INVENTION

The present invention provides a powdery material having a novel composition. The powdery material of the present invention contains at least Fe, B, and Pb, and furthermore can contain ferromagentic metals such as Co and Ni, or, as an additional element ($\alpha$), at least one metal selected from Al, P, Sc, Ti, Cr, Mn, Cu, Zn, Ga, As, Se, Sr, Y, Zr, Nb, Mo, Rh, Pd, Ag, Sn, Te, La, Ce, Pr, Nd, Pm, Sm, W, Re, Os, Ir, Pt, Au, Hg, Bi, and the like.

A most preferred composition of the present invention comprises about 30 to 95% by weight of Fe, about 0.5 to 20% by weight of B, about 0.1 to 20% by weight of Pb, and about 0 to 70% by weight of Co and/or Ni.

Furthermore, it has been found that the above described additional element ($\alpha$) can be contained as a part of the Co and/or Ni, and the effect of the present invention can be attained with a composition of Fe-B-Pb-Co-$\alpha$, Fe-B-Pb-Ni-$\alpha$, or Fe-B-Pb-Co-Ni-$\alpha$. In this case, the preferred range of ($\alpha$) is about 0.01% to 20% by weight. It is to be noted that the present invention is not limited to the above composition range since the effect of the present invention can be attained with a powder in which Fe is present in a proportion of about 50% or less.

In the present invention, B is contained in the borohydride or derivative thereof used as a reducing agent, and it is introduced into the powder in the reduction.

The powdery magnetic material containing at least Fe, B, and Pb according to the present invention is particularly excellent in anti-oxidation properties. The powdery magnetic material can be handled with ease during the production thereof because it is not combustible in air. Furthermore, the powder is excellent in orientation in a magentic field when used in preparing a tape because it has excellent dispersibility, and particularly, a high squareness ratio ($Br/Bs$) can be obtained.

The term "metal salt capable of forming a ferromagnetic substance containing at least Fe" designates those salts in which 8 any one of Fe, Fe-Co, Fe-Ni, and Fe-Co-Ni is contained, and, if desired, as described above at least one additional metal salt selected from Al, P, Sc, Ti, Cr, Mn, Cu, Zn, Ga, As, Se, Sr, Y, Zr, Nb, Mo, Rh, Pd, Ag, Sn, Te, La, Ce, Pr, Nd, Pm, Sm, W, Re, Os, Ir, Pt, Au, Hg, Bi, and the like is present for improving the magnetic properties and oxidation-stability.

Typical examples of these salts are the sulfates, chlorides, sulfides, nitrates, formates, acetates, pyrophosphates, sulfinates, and the like.

As the reactant for use in the oxidation-reduction reaction, one or more compounds selected from borohydride compounds such as borane, borazane, borohydride, sodium borohydride, potassium borohydride, dimethylamino borane, diethylaminoborane, and the like, or the derivatives thereof can be used.

The lead compound added to the reaction bath of the present invention includes the water-soluble inorganic or organic salts of lead. Representative examples of these salts are lead halides, lead halates and lead perhalates, e.g., lead chlorate, lead perchlorate, lead chloride, and the like, inorganic acid salts of lead, e.g., lead nitrate, lead thiosulfate, and the like, organic acid salts of lead, e.g., lead formate, lead acetate, lead propionate, and the like, etc. It is preferred that the molar ratio of the lead to the metal ion (Pb/metal ion) ranges from about 0.001:1 to 0.5:1.

To the reaction solution, i.e., the metal salt solution, in addition to the above described components, a complexing agent, a pH buffer agent, a pH controlling agent, and the like can be, if desired, added. Suitable pH buffer agents and complexing agents include monocarboxylic acids, e.g., formic acid, acetic acid, propionic acid, butyric acid, valeric acid, acrylic acid, trimethylacetic acid, benzoic acid, chloroacetic acid, and the like, and the salt thereof. Examples of complexing agents are dicarboxylic acids, e.g., oxalic acid, succinic acid, malonic acid, maleic acid, itaconic acid, p-phthalic acid, and the like, and the salt thereof; and oxycarboxylic acids, e.g., glycolic acid, lactic acid, salicylic acid, tartaric acid, citric acid, and the like, and the salts thereof. Illustrative pH buffer agents and pH controlling agents are boric acid, carbonic acid, sulfurous acid, and the like, and suitable examples of pH controlling agents, are organic acids, ammonia, alkali metal hydroxides, and the like in addition to inorganic acids, e.g., hydrochloric acid, sulfuric acid, phosphoric acid, nitric acid, and the like. In addition some of these additives may be employed for more than one function. For example, some compounds act as a pH buffer agent as well as a complexing agent, and thus the action of these additives is not restricted.

If desired, soluble proteins, carbohydrates, organic acids and the like can be added to the reaction bath. It is effective for the improvement of the properties to conduct the reaction while applying supersonic agitation to the reaction bath. The application of supersonic agitation is effected during the reaction and it is desired that the frequency of the supersonic agitation range from about $1.6 \times 10^4$ to $1.0 \times 10^6$ Hz. The chemical oxidation-reduction reaction occurs in an appropriately selected reaction bath by applying, if desired, a magentic field of several tens of oersteds or more to thereby produce a powdery ferromagnetic material.

Although the reaction conditions in the present invention are not particularly limited, a preferred pressure range is from about 0.5 to 5 atmospheres pressures. A preferred reaction temperature and pH are about 65° C or less and about 12 or less, respectively. A magentic field of several tens of oersteds or more is effective and a stronger magnetic field is preferred, a prefered range is from about 500 to 3,000 oe.

It has been found that the metal ion concentration is about 0.002 to 2 mole/l and preferably from 0.01 to 0.5 mole/l.

The concentration of the borohydride compound or derivative thereof used the reducing agent ranges preferably from about 0.0002 to 10 mole/l, and it has been found that the molar ratio of the reducing agent to the metal ion (reducing agent/metal ion) desirably ranges from about 0.1:1 to 5:1.

The ferromagnetic powder as produced by conducting the chemical oxidation-reduction reaction using the composition of the reaction bath and under the conditions as selected appropriately comprises particles of a size of about 100 to 20,000 A in the longitudinal directional and about 50 to 1,000 A in the width direction, and it has been observed that about 2 to about 20, more generally 3 to about 10, particles are connected to thereby produce a string-like, rod-like, or necklace-like form.

The particle size and the degree of the chaining as produced by the present invention can be controlled by the amount of the lead compound added, the kind of the composition, and the strength of the magnetic field applied.

The ferromagnetic powder produced by the present invention has a coercive force (Hc) of about 100 to 2,000 oe and a Bm value of about 8,000 G or more. The effect of the present invention can be increasd by heating the ferromagnetic powder in a non-oxidizing atmosphere such as an atmosphere of helium, argon, nitrogen, carbon monoxide, carbon dioxide, hydrogen, etc. or in the presence of a small amount of $H_2O$ or $O_2$, e.g., 10 volume % or less of water vapor or oxygen.

The powdery magnetic material for magnetic recording medium as produced above is mixed with a binder, if desired, together with any additives, and coated on a support using a coating solvent and dried, and thus a magnetic recording medium can be obtained.

Hitherto known thermoplastic resins, and thermosetting resins as a binder are used in the present invention together with the powdery magnetic material of the present invention.

Suitable thermoplastic resins are those resins which have a softening point of about 150° C or less, an average molecular weight of about 10,000 to 200,000, and a degree of polymerization of about 200 to 2,000, e.g., a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer, a polyvinyl fluoride resin, a vinylidene chloride-acrylonitrile copolymer, a butadiene-acrylonitrile copolymer, a polyamide resin, polyvinyl butyral, a cellulose derivative, a styrene-butadiene copolymer, a polyester resin, a chlorovinylether-acrylic acid ester copolymer, an amino resin, various synthetic rubber based thermoplastic resins, mixtures thereof, and the like.

These resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1972, U.S. Pat. Nos. 3,144,352, 3,419,420, 3,499,789, 3,713,887, etc.

The thermosetting resin or reactive type resin has a molecular weight of about 200,000 or less as a coating solution, and when heated after coating and drying, the molecular weight becomes infinity due to reactions such as condensation, addition, and the like. Of these resins, preferred resins are those resins which do not soften or melt before the thermal decomposition thereof. Representative examples of these resins are a phenol resin, an epoxy resin, a polyurethane hardening type resin, a urea resin, a melamine resin, an alkyd resin, a silicone resin, an acryl based reactive resin, an epoxy-polyamide resin, a mixture of a high molecular weight polyester resin and an isocyanate prepolymer, a mixture of a methacrylic acid salt copolymer and a diisocyanate prepolymer, a mixture of a polyester-polyol and a polyisocyanate, a urea formaldehyde resin, a mixture of a low molecular weight glycol, a high molecular weight diol, and triphenylmethane triisocyanate, a polyamine resin, mixtures thereof, and the like.

These resins are described in Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc.

These binders can be used alone or in combination with each other, and other additives can be added. The weight ratio of the ferromagnetic powder to the binder generally is about 300:30 to 300:300 and preferably 300:50 to 300:150. In this case, the dry thickness of the magnetic recording layer is in the range of 1 to 10 $\mu$.

Suitable additives which can be used include a dispersing agent, a lubricant, an abrasive agent, and the like.

Suitable dispersing agents are fatty acids containing about 12 to 18 carbon atoms (e.g., having the formula $R_1COOH$ wherein $R_1$ is an alkyl group containing about 11 to 17 carbon atoms), e.g., caprylic acid, capric acid, lauric acid, myristic acid, palmitic acid, stearic acid, oleic acid, elaidic acid, linolic acid, linolenic acid, stearolic acid, and the like; metallic soaps comprising the alkali metal (Li, Na, K, etc.) salts or the alkali earth metal (Mg, Ca, Ba, etc.) salts of the above described fatty acids; and lecithin, etc. can be used. In addition, higher alcohols containing about 12 or more carbon atoms and the sulfuric acid esters thereof can be used. These dispersing agents are generally employed in a proportion of about 1 to 20 parts by weight per 100 parts by weight of the binder.

Suitable lubricants include silicone oil, graphite, molybdenum disulfide, tungsten disulfide, fatty acid esters produced from a monobasic fatty acid containing about 12 to 16 carbon atoms and a monovalent alcohol containing about 3 to 12 carbon atoms, fatty acid esters produced from a monobasic fatty acid containing about 17 or more carbon atoms and a monovalent alcohol, in which the total number of carbon atoms ranges from about 15 to 28, and the like can be used. These lubricants are generally used in a proportion of about 0.2 to 20 parts by weight per 100 parts by weight of the binder. These lubricants are described in Japanese Patent Publication No. 23889/1968, Japanese Patent Application Nos. 28647/1967 and 81543/1968, etc.

Typical abrasive agents include the generally used materials, e.g., fused alumina, silicon carbide, chromium oxide, corundum, synthetic corundum, diamond, synthetic diamond, garnet, emery (main component: corundum and magnetite), and the like. Those abrasive agents are used which have an average particle size of from about 0.05 to 5 $\mu$, preferably from 0.1 to 2 $\mu$. The lubricant is generally used in a proportion of from about 7 to 20 parts by weight per 100 parts by weight of the binder. These abrasive agents are described in Japanese Patent Application No. 26749/1973.

The magnetic recording layer is formed by dissolving the above described components in an organic solvent and coating the resulting solution on a support.

The thickness of the support is generally about 5 to 50 $\mu$, preferably about 10 to 40 $\mu$. Suitable supports include polyesters, e.g., polyethylene terephthalate, and the like, polyolefins, e.g., polypropylene, and the like, cellulose derivatives, e.g., cellulose triacetate, cellulose diacetate, and the like, polycarbonate, and the like.

The magnetic recording layer can be formed on the support using air doctor coating, blade coating, air knife coating, squeeze coating, dip coating, reverse roll coating, transfer roll coating, gravure coating, kiss coating, cast coating, spray coating, and the like, and other methods can be also used. These methods are described in *Coating Kogaku* (*Coating Engineering*), pages 253 to 277, published by Asakura Shoten (March 20, 1971).

Typical organic solvents which can be used in the present invention include ketones, e.g., acetone, methyl ethyl ketone, methyl isobutyl ketone, cyclohexanone, and the like; alcohols, e.g., methanol, ethanol, propanol, butanol, and the like; esters, e.g., methyl acetate, ethyl acetate, butyl acetate, ethyl lactate, glycol monoethyl ether acetate, and the like; ethers and glycol ethers, e.g., diethyl ether, glycol monoethyl ether, glycol dimethyl ether, dioxane, and the like; aromatic hydrocarbons, e.g., benzene, toluene, xylene, and the like; chlorinated hydrocarbons, e.g., methylene chloride, ethylene chloride, carbon tetrachloride, chloroform, ethylene chlorohydrin, dichlorobenzene, and the like, etc. and these solvents can be used alone or in combination with each other.

The present invention will be explained in detail by reference to the following Examples and Comparison Examples. It is to be understood that many variations can be made in the components, proportions, operation sequence, and the like without departing from the spirit of the present invention, and the present invention is not to be considered as being restricted to the following Examples. Unless otherwise indicated herein, all parts, percents, ratios and the like are by weight.

EXAMPLE 1

| | Quantity (mole/liter) |
|---|---|
| $M_1$ Liquid | |
| Ferrous Chloride | 0.36 |
| Cobalt Chloride | 0.04 |
| Lead Acetate | 0.002 |
| $R_1$ Liquid | |
| $NaBH_4$ | 1.60 |

Note—Water used as the solvent in both of the $M_1$ and $R_1$ Liquids, hereinafter the same.

80 parts of the $M_1$ liquid was charged to a non-magnetic vessel and a direct current magnetic field of 1000 oe was applied to all of the vessel. 20 parts of the $R_1$ Liquid was added to the $M_1$ Liquid over a 10 second period while stirring gently to effect the reaction, and thus a ferromagnetic powder was obtained. The powder was washed, and then replaced with acetone, and dried in a drying oven at 60° C, and a ferromagnetic powder was obtained. This sample is designated No. P-1.

The following composition containing powder No. P-1 as produced above was charged to a ball mill and sufficiently mixed and dispersed to thereby prepare a magnetic coating composition.

| | Quantity (parts) |
|---|---|
| Ferromagnetic Powder (No. P-1) | 300 |
| Polyester Polyol [1] | 40 |
| Polyisocyanate Compound [2] | 20 |
| Nitrocellulose [3] | 20 |
| Chromium Oxide ($Cr_2O_3$; particle size about 0.5 micron) | 5 |
| Lecithin | 3 |
| Methyl Ethyl Ketone | 450 |
| Methyl Isobutyl Ketone | 400 |

[1] Comdensate of adipic acid and butanediol, having terminal hydroxy groups and a molecular weight of about 1800.
[2] Desmodur L: trade name, produced by Bayer A.G.; 75 wt.% ethyl acetate solution; adduct of 3 moles of toluene diisocyanate and 1 mole of trimethylol propane
[3] Molecular weight of about 800.

The composition was coated on one side of a polyethylene terephthalate film having a thickness of 25 microns in a dry thickness of 5 microns while applying a magnetic field and dried by heating. The thus prepared wide magnetic web was calendered and slit to a ½ inch width, and thus a video tape was obtained. The surface property of the video tape was quite excellent. This sample is designated No. T-1.

EXAMPLE 2

| | Quantity (mole/liter) |
|---|---|
| $M_2$ Liquid | |
| Ferrous Chloride | 0.40 |
| Lead Acetate | 0.02 |
| Sodium Tartrate | 0.10 |
| $R_2$ Liquid | |
| $NaBH_4$ | 1.60 |

The procedure of Example 1 was repeated using the $M_2$ and $R_2$ Liquids to thereby obtain a ferromagnetic powder. This sample is designated No. P-2. Also, the procedure of Example 1 was repeated using the powder (No. P-2) to thereby prepare a video tape. The surface property of the thus produced video tape was quite excellent. This sample is designated No. T-2.

EXAMPLE 3

| | Quantity (mole/liter) |
|---|---|
| $M_3$ Liquid | |

EXAMPLE 3-continued

| | Quantity (mole/liter) |
|---|---|
| Ferrous Chloride | 0.36 |
| Cobalt Chloride | 0.04 |
| Lead Acetate | 0.01 |
| Zinc Chloride | 0.005 |
| $R_3$ Liquid | |
| $NaBH_4$ | 1.60 |
| Diethylaminoborane | 0.20 |

The procedure of Example 1 was repeated using the $R_3$ and $M_3$ Liquids to thereby obtain a ferromagnetic powder. This sample is designated No. P-3. Also, the procedure of Example 1 was repeated using the powder (No. P-3) to thereby prepare a video tape. The appearance of the thus produced video tape was substantially the same as that of Example 1. This sample is designated No. T-3.

COMPARISON EXAMPLE 1

| | Quantity (mole/liter) |
|---|---|
| $Mc_1$ Liquid | |
| Ferrous Chloride | 0.36 |
| Cobalt Chloride | 0.04 |
| $Rc_1$ Liquid | |
| $NaBH_4$ | 1.60 |

A ferromagnetic powder was produced using the $Mc_1$ and $Rc_1$ Liquids under the same conditions and in the same manner as in Example 1. This sample is designated No. P-4. A video tape was produced using the powder (No. P-4) in the same manner as in Example 1. This sample is designated No. T-4.

COMPARISON EXAMPLE 2

| | Quantity (mole/liter) |
|---|---|
| $Mc_2$ Liquid | |
| Ferrous Chloride | 0.40 |
| Sodium Tartrate | 0.10 |
| $Rc_2$ Liquid | |
| $NaBH_4$ | 1.60 |

A ferromagnetic powder was produced using the $Mc_2$ and $Rc_2$ Liquids under the same conditions and in the same manner as in Example 2. This sample is designated No. P-5. A video tape was produced using the powder (No. P-5) in the same manner as in Example 2. This sample is designated No. T-5.

COMPARISON EXAMPLE 3

| | Quantity (mole/liter) |
|---|---|
| $Mc_3$ Liquid | |
| Ferrous Chloride | 0.36 |
| Cobalt Chloride | 0.04 |
| Zinc Chloride | 0.005 |
| $Rc_3$ Liquid | |
| $NaBH_4$ | 1.60 |
| Diethylaminoborane | 0.20 |

A ferromagnetic powder was produced using the $Mc_3$ and $Rc_3$ Liquids under the same conditions and in the same manner as in Example 3. This sample is designated No. P-6. A video tape was produced using the powder (No. P-6) in the same manner as in Example 3. This sample is designated No. T-6.

The properties of the six samples as obtained in Examples 1 to 3 and Comparison Examples 1 to 3 were compared and the results obtained are shown in Table 1 below.

Table 1

| Example No. | Sample | Hc (oe) | Br/Bs | Surface(*) property | Dispersibility(*) | Output of(**) 5 MHz (dB) |
|---|---|---|---|---|---|---|
| Example | | | | | | |
| 1 | No. T-1 | 1,050 | 0.83 | Good | Good | + 3.5 |
| 2 | No. T-2 | 780 | 0.86 | Excellent | Good | + 3.9 |
| 3 | No. T-3 | 1,200 | 0.80 | Good | Good | + 0.5 |
| Comparison Example | | | | | | |
| 1 | No. T-4 | 1,100 | 0.80 | Average | Average | 0 |
| 2 | No. T-5 | 800 | 0.83 | Good | Average | + 0.2 |
| 3 | No. T-6 | 1,250 | 0.78 | Bad | Bad | − 2.5 |

(*): The surface property and dispersibility were measured with No. T-4 as a standard.
(**): The output of 5 MHz was measured with the output of No. T-4 as 0 dB.

Furthermore, the composition, the particle size, and the Bs value of the powders are shown in Table 2, and the decreasing in the magnetism in an atmosphere of 60° C and 90% RH (Bs value decreases due to the oxidation of the sample) is shown in the figure.

Table 2

| Example No. | Sample | Bs Value (G) | Particle Size (A) | Composition (%) | | | | |
|---|---|---|---|---|---|---|---|---|
| | | | | Fe | B | Pb | Co | Zn |
| Example | | | | | | | | |
| 1 | No. P-1 | 11,000 | 250 | 72.2 | 5.5 | 0.3 | 7.0 | — |
| 2 | No. P-2 | 12,000 | 400 | 81.5 | 5.5 | 2.8 | — | — |
| 3 | No. P-3 | 10,500 | 300 | 73.0 | 5.8 | 1.3 | 7.4 | 0.5 |
| Comparison Example | | | | | | | | |
| 1 | No. P-4 | 11,000 | 250 | 72.0 | 5.6 | — | 7.0 | — |
| 2 | No. P-5 | 12,000 | 350 | 80.6 | 5.7 | — | — | — |
| 3 | No. P-6 | 10,200 | 300 | 72.2 | 5.8 | — | 7.2 | 0.5 |

As is apparent from the results of the Examples and Comparison Examples, the powdery magnetic material containing at least Fe, B, and Pb of the present invention is excellent particularly in anti-oxidation properties. Furthermore, it has been found that the powdery magnetic material is excellent in orientation in a magnetic field when used in producing a tape, and that a high squareness ratio (Br/Bs) is obtained.

While the invention has been described in detail and with reference to specific embodiments thereof, it will be apparent to one skilled in the art that various changes and modifications can be made therein without departing from the spirit and scope thereof.

What is claimed is:

1. A ferromagnetic metal powder for a magnetic recording medium comprising
   a. about 30 to 95% by weight of Fe;
   b. about 0.5 to 20% by weight of B;
   c. about 0.1 to 20% by weight of Pb; and
   d. about 0 to 70% by weight of Co and/or Ni produced by reducing in an aqueous solution a metal salt containing at least Fe and capable of forming a ferromagnetic substrance and using at least one member selected from the group consisting of a borohydride compound and a derivative thereof wherein said reduction is in the presence of at least one lead compound in said aqueous solution.

2. The ferromagnetic metal powder according to claim 1, which further contains about 0.01% to 20% by weight of at least one additional element selected from the group consisting of Al, P, Ti, Cr, Mn, Cu, Zn and Sn.

3. The ferromagnetic metal powder according to claim 1, wherein said metal powder comprises particles of a size of about 100 to 20,00 A in the longitudinal direction.

4. The ferromagnetic metal powder according to claim 1, wherein said metal powder comprises particles of a size of about 50 to 1,000 A in the width direction.

5. The ferromagnetic metal powder according to claim 1, wherein said metal powder comprises string-like forms wherein about 2 to about 20 particles are connected together.

6. The ferromagnetic metal powder according to claim 1, wherein the molar ratio of lead to the metal ion from said metal salt is about 0.001:1 to 0.5:1.

7. The ferromagnetic metal powder according to claim 1, wherein the lead compound is selected from the group consisting of a water-soluble inorganic lead salt and a water-soluble organic lead salt.

8. The ferromagnetic metal powder according to claim 7, wherein said lead compound is at least one compound selected from the group consisting of an inorganic acid salt of lead and an organic acid salt of lead.

9. The ferromagnetic metal powder according to claim 1, wherein the concentration of the metal salt containing at least Fe and capable of forming a ferromagnetic substance in the aqueous solution is about 0.002 to 2 mole/liter.

10. The ferromagnetic metal powder according to claim 1, wherein the metal salt containing at least Fe is selected from the group consisting of the sulfates, chlorides sulfides, nitrates, formates, acetates, pyrophosphates, and sulfinates of Fe-Co, Fe-Ni, or Fe-Co-Ni.

11. The ferromagnetic metal powder according to claim 1, wherein the concentration of the borohydride compound or derivative thereof in the aqueous solution is about 0.0002 to 10 mole/liter.

12. The ferromagnetic metal powder according to claim 11, wherein the borohydride compound or derivative thereof is selected from the group consisting of borane, borazane, borohydride, sodium borohydride, potassium borohydride, dimethylaminoborane and diethylaminoborane.

13. The ferromagnetic metal powder according to claim 1, wherein said reduction is under a pressure of about 0.5 to 5 atmospheres at a temperature of about 65° C or less and at a pH of about 12 or less.

14. The ferromagnetic metal podwer according to claim 13 including applying a magnetic field of about 500 to 3,000 oe to the reaction system during said reduction.

15. The ferromagnetic metal powder according to claim 1, wherein said metal powder has a coercive force ($Hc$) of about 100 to 2,000 oe and a $Bm$ value of about 8,000 G or more.

16. In a process for producing a powdery ferromagnetic metal material comprising reducing in an aqueous solution a metal salt containing at least Fe and capable of forming a ferromagnetic substance and using at least one member selected from the group consisting of a borohydride compound and a derivative thereof, the improvement which comprises reducing said metal salt in the presence of at least one lead compound in said aqueous solution with the molar ratio of lead to metal ion at about 0.001:1 to 0.5:1.

17. The process according to claim 16, wherein the lead compound is selected from the group consisting of a water-soluble inorganic lead salt and a water-soluble organic lead salt.

18. The process according to claim 17, wherein the lead compound is at least one compound selected from the group consisting of an inorganic acid salt of lead and an organic acid salt of lead.

19. The process according to claim 16, wherein the concentration of the metal salt containing at least Fe and capable of forming a ferromagnetic substance in the aqueous solution is about 0.002 to 2 mole/liter.

20. The process according to claim 16, wherein the metal salt containing at least Fe is selected from the group consisting of the sulfates, chlorides, sulfides, nitrates, formates, acetates, pyrophosphates, and sulfinates of Fe-Co, Fe-Ni, or Fe-Co-Ni.

21. The process according to claim 20, wherein the aqueous solution additionally contains at least one metal salt selected from the group consisting of Al, P, Sc, Ti, Cr, Mn, Cu, Zn, Ga, As, Se, Sr, Y, Zr, Nb, Mo, Rh, Pd, Ag, Sn, Te, La, Ce, Pr, Nd, Pm, Sn, W, Re, Os, Ir, Pt, Au, Hg, and Bi.

22. The process according to claim 16, wherein the concentration of the borohydride compound or derivative thereof in the aqueous solution is about 0.0002 to 10 mole/liter.

23. The process according to claim 22, wherein the borohydride compound or derivative thereof is selected from the group consisting of borane, borazane, borohydride, sodium borohydride, potassium borohydride, dimethylaminoborane, and diethylaminoborane.

24. The process according to claim 16, wherein the reducing is under of a pressure of about 0.5 to 5 atmospheres at a temperature of about 65° C or less, and at a pH of about 12 or less.

25. The process according to claim 24, including applying a magnetic field of about 500 to 3,000 oe to the reaction system during the reducing.

* * * * *